US009429819B2

(12) United States Patent
Ozawa et al.

(10) Patent No.: US 9,429,819 B2
(45) Date of Patent: Aug. 30, 2016

(54) CAMERA AND OPTICAL UNIT

(71) Applicant: SONY CORPORATION, Tokyo (JP)

(72) Inventors: Kenichi Ozawa, Kanagawa (JP); Sunao Kushiro, Chiba (JP); Satoshi Moriyama, Kanagawa (JP); Junpei Yamauchi, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 52 days.

(21) Appl. No.: 14/597,901

(22) Filed: Jan. 15, 2015

(65) Prior Publication Data

US 2015/0212394 A1 Jul. 30, 2015

(30) Foreign Application Priority Data

Jan. 30, 2014 (JP) ................. 2014-015453

(51) Int. Cl.
| | |
|---|---|
| *H04N 5/335* | (2011.01) |
| *H04N 9/083* | (2006.01) |
| *H04N 3/16* | (2006.01) |
| *G03B 17/14* | (2006.01) |
| *G03B 7/18* | (2006.01) |
| *G02B 7/00* | (2006.01) |
| *H04N 5/225* | (2006.01) |
| *G02B 26/02* | (2006.01) |

(52) U.S. Cl.
CPC ............. *G03B 17/14* (2013.01); *G02B 7/006* (2013.01); *G02B 26/023* (2013.01); *G03B 7/18* (2013.01); *H04N 5/2254* (2013.01)

(58) Field of Classification Search
CPC .... G02B 26/023; G02B 7/006; G03B 17/14; G03B 7/18; H04N 5/2254; H04N 5/232; H04N 5/23209
See application file for complete search history.

(56) References Cited

U.S. PATENT DOCUMENTS

| | | | | |
|---|---|---|---|---|
| 5,986,767 | A * | 11/1999 | Nakano ................... | G01J 3/524 356/416 |
| 7,656,531 | B2 * | 2/2010 | Wang ................. | G01M 11/0207 356/418 |
| 9,071,721 | B1 * | 6/2015 | D'Amico ................. | H04N 9/04 |
| 2005/0135798 | A1 * | 6/2005 | Szajewski ............. | G03B 41/00 396/335 |
| 2012/0281072 | A1 * | 11/2012 | Georgiev ............... | G03B 11/00 348/49 |

FOREIGN PATENT DOCUMENTS

JP 2008-259118 A 10/2008

* cited by examiner

*Primary Examiner* — Trung Diep
(74) *Attorney, Agent, or Firm* — Chip Law Group

(57) ABSTRACT

A camera that has an optical unit includes: a base plate; a plurality of openings which is provided on the base plate and each of which has a substantially rectangular opening shape having long sides and short sides; and a plurality of optical components each of which covers any of the plurality of openings. The plurality of openings is disposed to be cyclically placed in one optical path through rotation of the base plate, and is disposed such that a part of a long side of each opening thereof faces a part of a short side of another opening thereof adjacent thereto.

20 Claims, 13 Drawing Sheets

CAMERA AND OPTICAL UNIT

CROSS REFERENCE TO RELATED APPLICATIONS

This application claims the benefit of Japanese Priority Patent Application JP 2014-015453 filed Jan. 30, 2014, the entire contents of which are incorporated herein by reference.

BACKGROUND

The present disclosure relates to a camera and an optical unit mounted on the camera. In cameras for business or consumer, methods of performing photography whenever a video condition is changed by mechanically switching plural types of optical components have spread (for example, refer to Japanese Unexamined Patent Application Publication No. 2008-259118).

SUMMARY

Meanwhile, when the methods are employed, a unit (optical unit) for switching the optical components is mounted on a camera, and thus the volume of a camera increases. In order to reduce the size of a product, it is preferable to reduce space for mounting of the optical unit.

According to the present disclosure, it is desirable to provide a camera, which is capable of achieving reduction in size through reduction in the space for mounting, and an optical unit mounted on the camera.

According to an embodiment of the present disclosure, there is provided a first camera that has an optical unit, the camera including: a base plate; a plurality of openings which is provided on the base plate and each of which has a substantially rectangular opening shape having long sides and short sides; and a plurality of optical components each of which covers any of the plurality of openings, in which the plurality of openings is disposed to be cyclically placed in one optical path through rotation of the base plate, and is disposed such that a part of a long side of each opening thereof faces a part of a short side of another opening thereof adjacent thereto.

According to another embodiment of the present disclosure, there is provided a second camera that has an optical unit, the camera including: a base plate; a plurality of openings which is provided on the base plate and each of which has a substantially rectangular opening shape having long sides and short sides; and a plurality of optical components each of which covers any of the plurality of openings, in which the plurality of openings is disposed to be cyclically placed in one optical path through rotation of the base plate, and is disposed such that a segment, which equally divides each opening thereof in parallel with a long side of the opening, is deviated from a third axis which extends radially from a rotation center of the base plate.

According to still another embodiment of the present disclosure, there is provided an optical unit including: a base plate; a plurality of openings which is provided on the base plate and each of which has a substantially rectangular opening shape having long sides and short sides; and a plurality of optical components each of which covers any of the plurality of openings, in which the plurality of openings is disposed such that a part of a long side of each opening thereof faces a part of a short side of another opening thereof adjacent thereto.

In the first camera according to the embodiment of the present disclosure or the optical unit according to the embodiment of the present disclosure, each opening of the plurality of openings provided on the base plate is formed in a substantially rectangular shape. Thereby, for example, compared with a case where the opening is formed in a circular shape, there is less waste of a projection area. Further, the plurality of openings is disposed such that a part of the long side of each opening thereof faces a part of the short side of another opening thereof adjacent thereto. Thereby, for example, compared with a case where the plurality of openings is disposed to be radially arranged as a whole, the projection area (diameter) of the base plate is small.

In the second camera according to the embodiment of the present disclosure, each opening of the plurality of openings provided on the base plate is formed in a substantially rectangular shape. Thereby, for example, compared with a case where the opening is formed in a circular shape, there is less waste of a projection area. Further, the plurality of openings is disposed such that a segment, which equally divides each opening thereof in parallel with a long side of the opening, is deviated from a third axis which extends radially from a rotation center of the base plate. Thereby, for example, compared with a case where the plurality of openings is disposed to be radially arranged as a whole, the projection area (diameter) of the base plate is small.

According to the first camera of the embodiment of the present disclosure or the optical unit of the present disclosure, each opening of the plurality of openings provided on the base plate is formed in a substantially rectangular shape, and is disposed such that a part of the long side of each opening faces a part of the short side of another opening adjacent thereto. Thereby, it is possible to reduce the projection area of the base plate. Accordingly, it is possible to achieve reduction in size through reduction in the space for mounting.

According to the second camera of the embodiment of the present disclosure, each opening of the plurality of openings provided on the base plate is formed in a substantially rectangular shape, and is disposed such that the segment, which equally divides each opening thereof in parallel with the long side of the opening, is deviated from the third axis which extends radially from the rotation center of the base plate. Thereby, it is possible to reduce the projection area of the base plate. Accordingly, it is possible to achieve reduction in size through reduction in the space for mounting.

It should be noted that the above-mentioned contents are just examples of the present disclosure. Advantages of the present disclosure are not limited to the above description, and may be different advantages, and may include other advantages.

DETAILED DESCRIPTION OF EMBODIMENTS

Hereinafter, embodiments of the present disclosure will be described in detail with reference to the accompanying drawings. It should be noted that description will be given in the following order: 1. Embodiment (Example of a camera equipped with an optical unit for switching a plurality of optical components); 2. First Application Example (Example in which a cinema photography lens is mounted); and 3. Second Application Example (Example in which a still image photography lens is mounted).

Embodiment

Configuration

Figure 1:
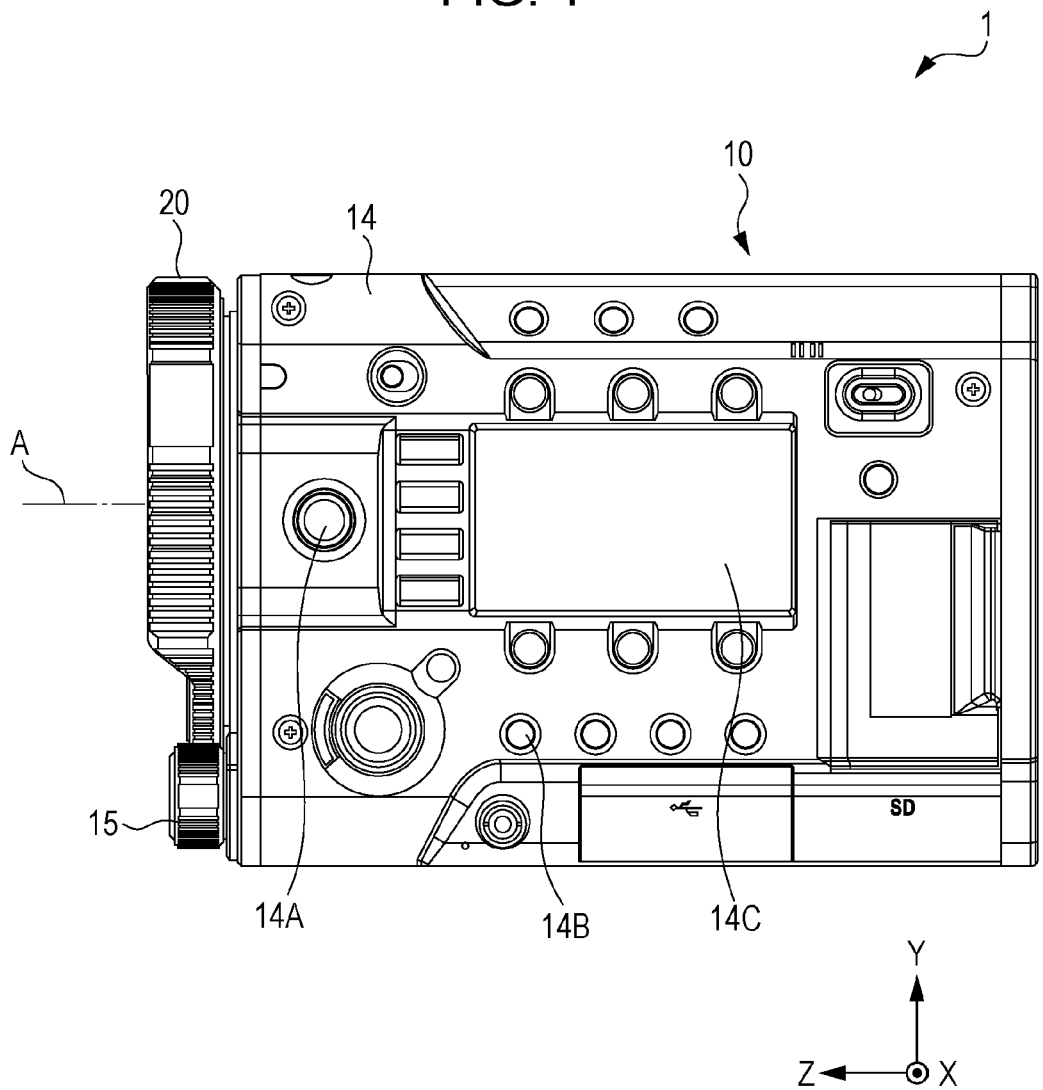
FIG. 1 is a side view illustrating an appearance of a body of a camera according to an embodiment of the present disclosure as viewed from a right side surface.
Figure 2:
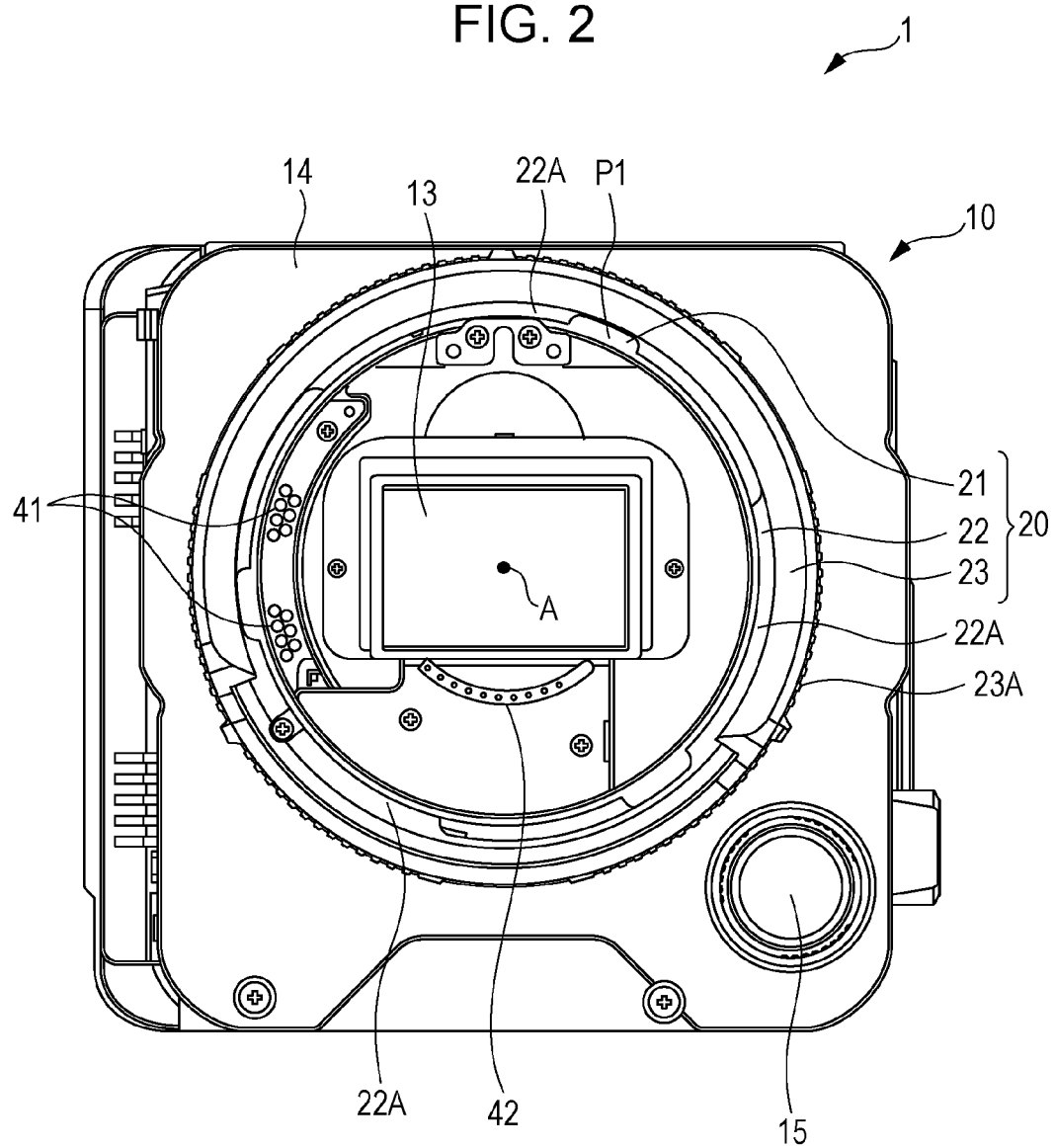
FIG. 2 is a front view illustrating an appearance of the body shown in FIG. 1 as viewed from the front side.

FIG. 1 shows an appearance of a body 10 of a camera (camera 1) according to an embodiment of the present disclosure as viewed from a right side surface. FIG. 2 shows an appearance of the body 10 shown in FIG. 1 as viewed from the front side. The camera 1 is, for example, a camera for cinema photography or for television broadcast, and is capable of lens interchange (mounting or unmounting of a lens). The camera 1 has a body mount 20 in the front of the body 10 in an optical axis direction Z.

In the following description and drawings, Z indicates an optical axis direction. An optical axis A is a line that passes through the centers of lenses, an optical component 13, an imaging device 11, and the like. In the optical axis direction Z, the object side (subject side) is referred to as the front, and the imaging surface side is referred to as the rear. An X direction indicates the left-right direction as the body mount 20 is viewed from the front side, and a Y direction indicates the up-down direction as the body mount 20 is viewed from the front side.

The body 10 has a casing member 14. Thus, inside the casing member 14, an imaging device (not shown in the drawing) such as an image sensor is provided (an imaging device is built into the body 10). On the respective surfaces of the casing member 14, there are appropriately provided not only a recording start button 14A, a menu selection button 14B, and a side panel 14C, but also various operation buttons and adjustment buttons, an accessory mount section such as a viewfinder, an external memory housing section, a USB connection section, a battery connection section, and the like. The body 10 has a unique flange back (a distance between the mount surface and the imaging surface in the optical axis direction Z). Basically, a lens corresponding to the flange back unique to the body 10 is mounted on the body mount 20 of the body 10. However, as described later, by using a predetermined adapter, a lens corresponding to a longer (or shorter) flange back can be mounted thereon.

The body mount 20 is formed as a connection section between the lens or the adapter and the body 10. The body mount 20 is provided, as shown in FIG. 2, on the front top center of the casing member 14 of the body 10. The optical component 13 is provided at the center of the inside of the body mount 20. On the rear side of the optical component 13 in the optical axis direction Z, the imaging device is disposed. In a region around the optical component 13 inside the body mount 20, a first contact point 41 and a second contact point 42 are provided. Further, an operation dial 15 is provided on the lower right side of the front surface of the casing member 14 of the body 10. The operation dial 15 is to assist a user to switch optical components (optical components 18A to 18D to be described later) which are disposed between the optical component 13 and the imaging device. It should be noted that the operation dial 15 corresponds to one specific example of the "operation section" of the present disclosure. However, the present disclosure is not limited to a rotation type (dial type) as shown in the embodiment, and a push type such as the operation button may be used.

Figure 3:
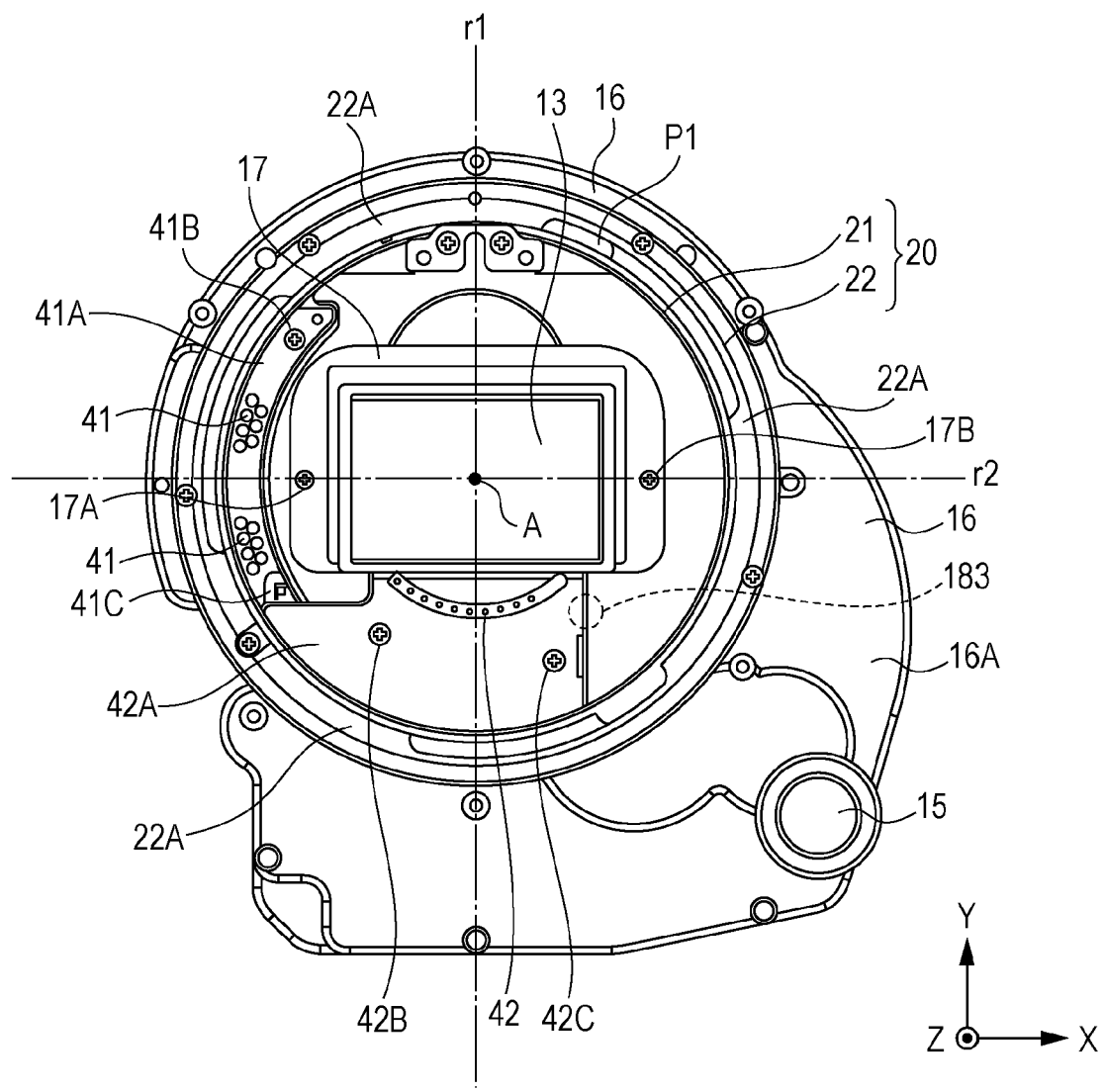
FIG. 3 is a front view illustrating a configuration of a body mount shown in FIG. 2 in a situation where the body mount is drawn from a casing member as viewed from the front side.

FIG. 3 is a front view illustrating a configuration of a body mount 20 shown in FIG. 2 in a situation where the body mount is drawn from a casing member 14 as viewed from the front side. The body mount 20 is mounted on a chassis member 16. The body mount 20 occupies a region ranging from the left side of the chassis member 16 to the upper side thereof. The chassis member 16 has a housing section 16A that is formed to be projected toward the lower side and the lower right side of the body mount 20. The housing section 16A houses a turret (optical unit 18) that holds optical components 18A to 18D. The above-mentioned operation dial 15 is provided on the lower right side of the housing section 16A. A user turns the operation dial 15 so as to rotate an optical unit 18, thereby switching the optical components 18A to 18D. A configuration of the optical unit 18 will be described later.

In the body mount 20, for example, as a method of mounting a lens or an adapter, a spigot method is employed. Thus, for example, the body mount 20 includes, in an order from the inner circumferential side, a mount ring 21, a holding ring 22, and a fastening ring 23. It should be noted that FIG. 3 shows only the mount ring 21 and the holding ring 22 and the fastening ring 23 is not shown in FIG. 3 and is shown in FIG. 2. By employing a spigot method in the body mount 20, a heavy large-sized lens for cinema photography can be robustly fastened to the body 10, and thus reliability increases. Further, an advantage exists in that it is possible to mount or unmount a lens without rotating the lens.

The mount ring 21 is a portion for connecting the adapter or a rear end portion of the lens. The holding ring 22 is a portion for holding the adapter or a rear end portion of the lens. The holding ring 22 has blades 22A at three locations in the circumferential direction. The fastening ring 23 fastens and fixes the lens or the adapter and the body mount 20 by rotating the fastening ring 23 together with the holding ring 22 around the optical axis A. It is preferable that an unevenness slip stopper 23A be provided on the outer surface of the fastening ring 23 so as to help a user to easily turn the fastening ring 23.

The optical component 13 is, for example, a glass plate member that has a function of protecting the imaging device 11 and an appropriate optical function. The optical component 13 has, for example, a rectangular shape that is long in one direction, and is disposed at the center of the circular region surrounded by the body mount 20 so as to be horizontally long. In addition, it is needless to say that the imaging device is disposed to be horizontally long in a manner similar to that of the optical component 13. The optical component 13 is supported by an optical component supporting member 17. The optical component supporting member 17 is fixed onto the chassis member 16 through screws 17A and 17B.

The first contact point 41 is, for example, to electrically connect the lens (referred to as a first lens), which has the flange back unique to the body 10, and the body 10. Specifically, the first contact point 41 means, for example, a set of contact points. The set includes: a contact point for supplying power from the body 10 to the first lens; and a contact point for supplying a driving signal from the body 10 to the first lens. The position of the first contact point 41 is not particularly limited, but for example as viewed from the front side, the first contact point 41 is disposed near the outer circumference of the body mount 20 on the left side thereof. In other words, the first contact point 41 is disposed in an arc shape along the short side of the optical component 13 on the left side thereof. The first contact point 41 is supported by a first contact point supporting member 41A. The first contact point supporting member 41A is fixed onto and supported by the chassis member 16 through screws 41B and 41C.

The second contact point 42 is, for example, to electrically connect the lens (referred to as a second lens), which has a flange back different from the flange back unique to the body 10, and the body 10. Specifically, the second contact point 42 means, for example, a set of contact points. The set includes: a contact point for supplying power from the body 10 to the second lens; and a contact point for supplying a driving signal from the body 10 to the second lens. The position of the second contact point 42 is not particularly limited, but for example as viewed from the front side, the second contact point 42 is disposed near the outer circumference of the body mount 20 on the lower side thereof. In other words, the second contact point 42 is disposed in an arc shape along the long side of the optical component 13 on the lower side thereof. The second contact point 42 is supported by a second contact point supporting member 42A. The second contact point supporting member 42A is fixed onto and supported by the chassis member 16 through screws 42B and 42C.

It is preferable that the second contact point 42 be positioned to be closer to the inner circumference of the body mount 20 than the first contact point 41 in a diameter direction of the body mount 20. Thereby, in a state where an adapter 30 is mounted on a first reference surface P1, the second contact point 42 is exposed to the inner circumference side of the adapter 30, whereby the second contact point 42 and a second lens 2B can be easily connected. Further, from the viewpoint of ease of layout, it is preferable that the first contact point 41 and the second contact point 42 be disposed at a different position in the circumferential direction of the body mount 20. It should be noted that the first contact point 41 and the second contact point 42 may be disposed at the same position or substantially the same position in the circumferential direction of the body mount 20.

Hereinafter, a specific configuration of the optical unit 18 will be described.

Optical Unit 18

Figure 4:
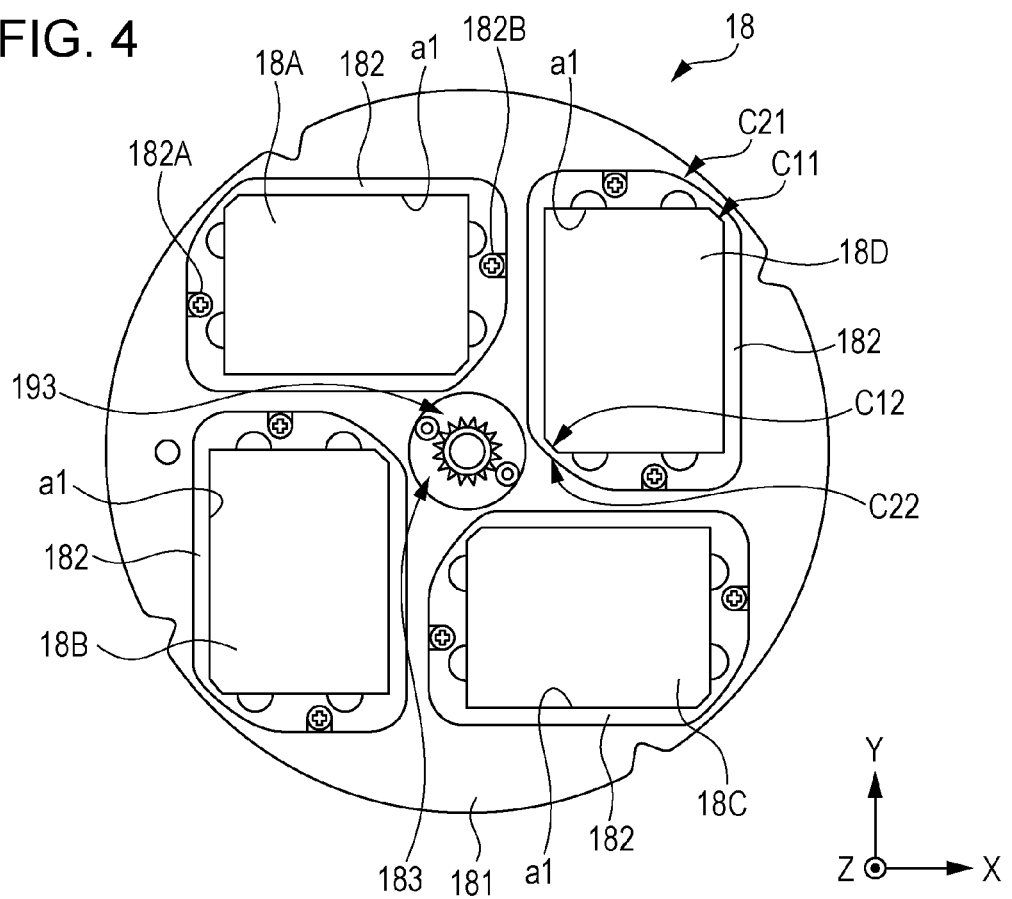
FIG. 4 is a front view illustrating a configuration of an optical unit, which is mounted on the camera shown in FIG. 1, as viewed from the front side.
Figure 5:
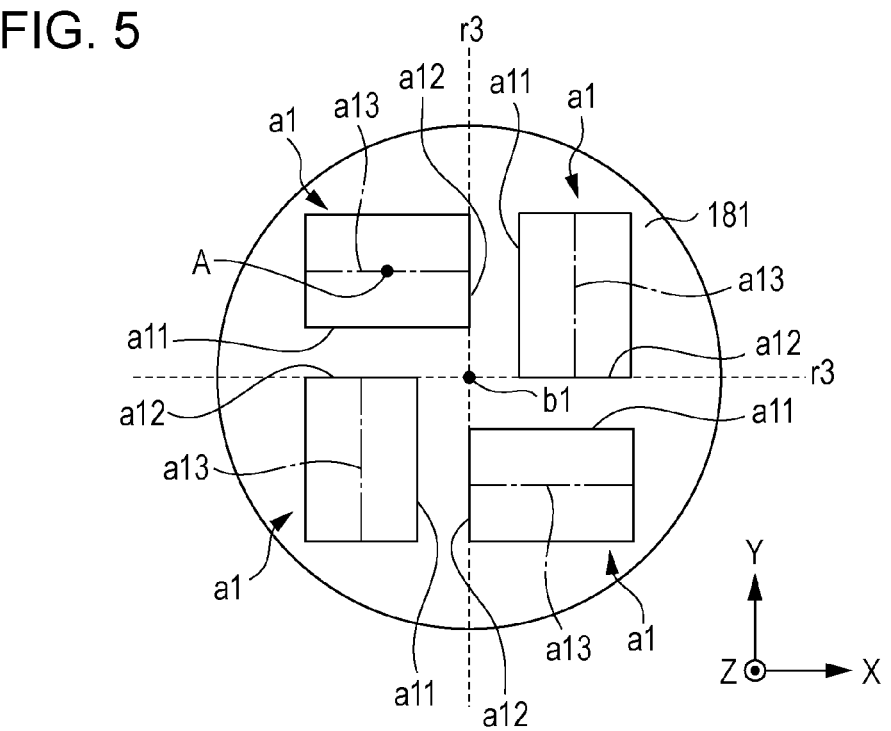
FIG. 5 is a schematic plan view illustrating a configuration of layout of openings.
Figure 6:
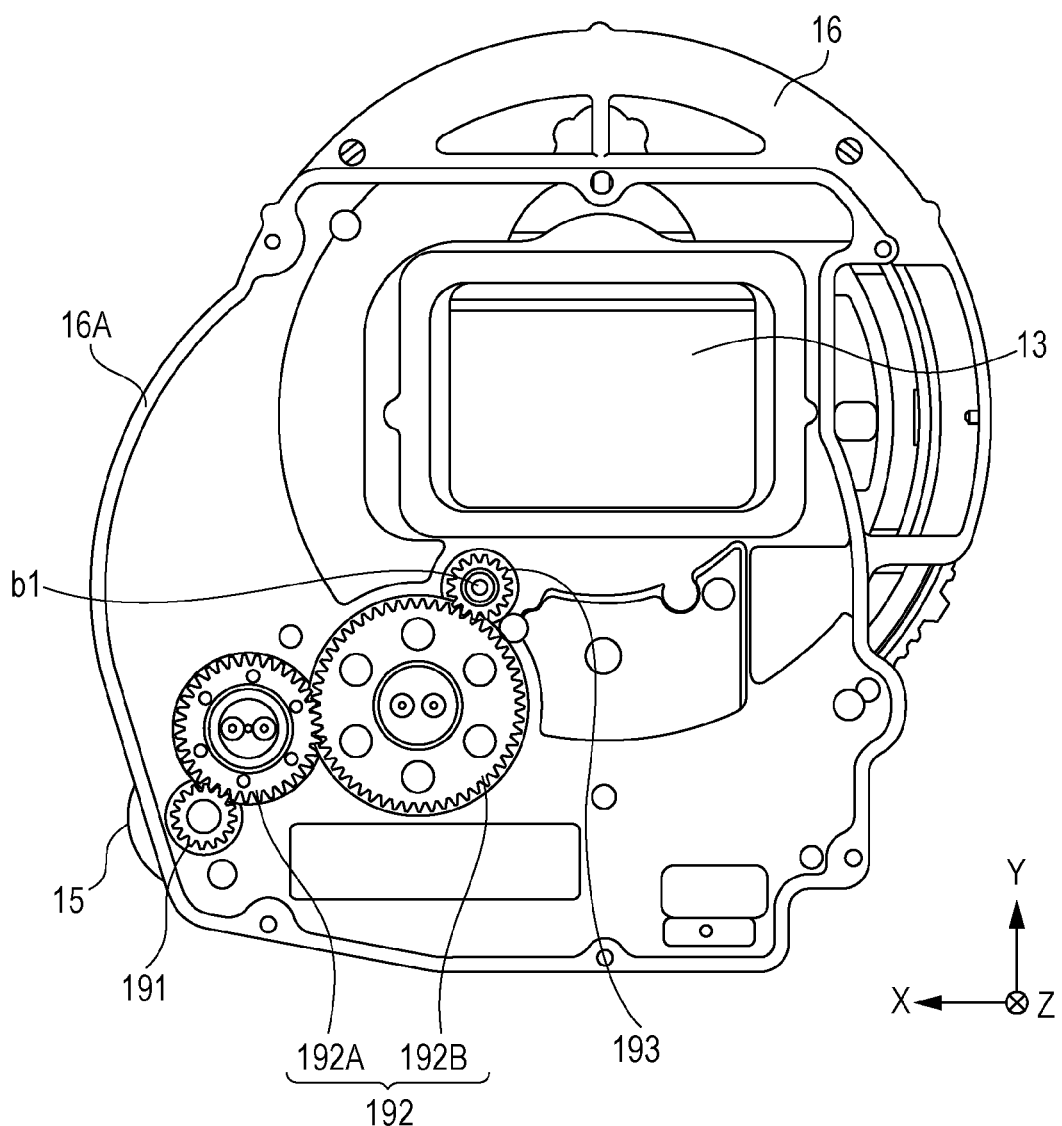
FIG. 6 is a view illustrating a configuration of the rear side of the body mount shown in FIG. 3 (in a situation where the optical unit is removed)
Figure 7:
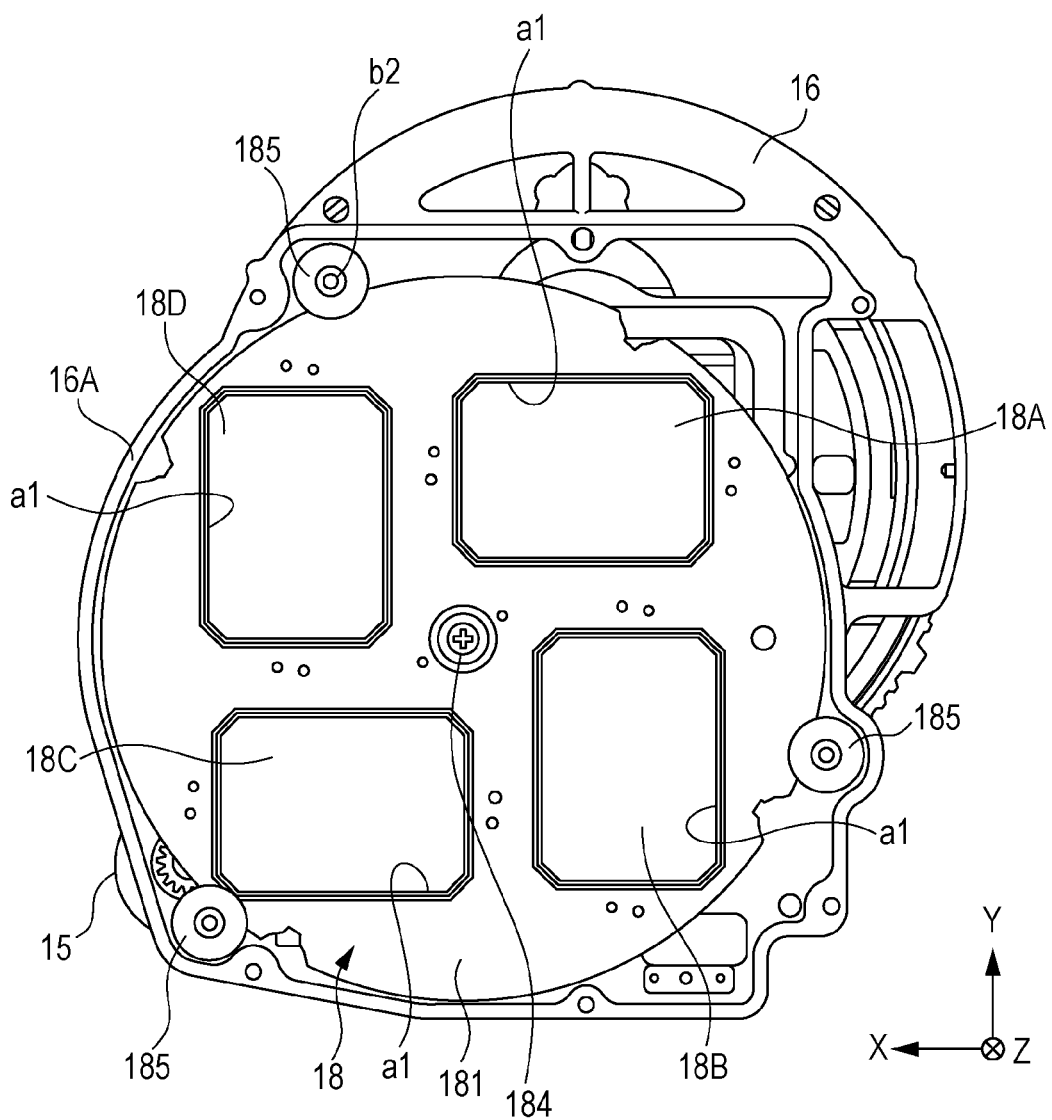
FIG. 7 is a rear view illustrating a configuration of the rear side of the body mount shown in FIG. 3 (in a situation where the optical unit is mounted)

FIG. 4 is a front view of the optical unit 18. FIG. 5 is a schematic view illustrating a configuration of layout of openings a1 on a base plate 181. FIGS. 6 and 7 show a configuration of the rear side (imaging surface side) of the body mount 20. However, FIG. 6 shows a situation where the optical unit 18 is removed from the housing section 16A. FIG. 7 shows a situation where the optical unit 18 is mounted on an extended section 16B. The optical unit 18 is rotatably housed (held) by the housing section 16A of the chassis member 16.

The optical unit 18 has, as shown in FIG. 4, for example, the base plate 181 having a discoidal shape (a shape of the XY plane is circular), and the plurality of (here, four) optical components 18A to 18D held on the base plate 181. The optical components 18A to 18D are optical filters that have optical functions such as functions of controlling transmittances, wavelengths, or polarization of light. Examples of such optical filters includes an ND filter (dark filter), a PL filter (polarization filter), and the like. As the optical components 18A to 18D, (plural types of) optical filters having functions different from one another are used. For example, as the optical components 18A to 18D, it may be possible to use plural types of the ND filters of which the transmittances are different from one another. Alternatively, as the optical components 18A to 18D, it may be possible to use plural types of the PL filters of which the polarization directions are different from one another.

Further, any one of the optical components 18A to 18D may be a transparent glass plate which does not have the above-mentioned optical functions. The base plate 181 has a plurality of openings (in the embodiment, the openings a1 provided on the frame members 182). Thus, each of the optical components 18A to 18D is provided to cover any of the plurality of openings a1. Specifically, the frame members 182 are fixed onto the opening portions (not shown in the drawing) which are open to the base plate 181. Thus, the optical components 18A to 18D are fixed onto or supported on the openings a1 provided on the frame members 182.

In other words, the optical components 18A to 18D are mounted on the base plate 181 through the frame members 182. In this example, the frame member 182 defines an effective opening of the optical unit 18, and the opening a1 corresponds to one specific example of the "opening" in the present disclosure. The opening shape of the opening a1 is a substantially rectangular shape (hereinafter referred to as a rectangular shape) having the long sides and the short sides. Each surface shape (XY plane shape) of the optical components 18A to 18D generally follows the rectangular shape of the openings a1. It is preferable that the opening shape of the opening a1 is similar to the shape of the imaging surface of the imaging device. It should be noted that the "substantially rectangular shape" is not limited to a mathematical square (rectangle), and may be such a shape as has the long sides and the short sides. Further, for example, the side portions may be curved, or the corner portions may be cut off (it will be described later), and the corner portions may be rounded off.

The frame members 182 are fixed onto the base plate 181 through the screws 182A and 182B. By using the frame members 182, the optical components 18A to 18D are detachably provided on the base plate 181. Here, by using spaces in the vicinity of the short sides of each openings a1, each frame member 182 is fixed through two screws 182A and 182B. The number and the positions of screws and the like are not particularly limited. However, in consideration of space saving, it is preferable that the screws be provided using a space which is as vacant as possible.

With such a configuration, in the rectangular shape of the opening a1 of the frame member 182, the corner portions facing the circumference of the base plate 181 are cut off (a shape C11 in FIG. 4). Further, in the outer circumferential portion of the frame member 182, the corner portions facing the circumference of the base plate 181 are rounded off along the circumference (a shape C21 in FIG. 4). Thereby, while decreasing the size (diameter) of the base plate 181, it is possible to maintain the mechanical strength of the vicinity portion of the corresponding corner portion.

Meanwhile, in each rectangular shape of the openings a1, the corner portions facing the central portion 183 of the base plate 181 are cut off (a shape C12 in FIG. 4). Further, in the outer circumferential portion of the frame member 182, the corner portions facing the central portion 183 of the base plate 181 are rounded off (a shape C22 in FIG. 4), similarly to the shape C21. Thereby, while decreasing the size (diameter) of the base plate 181, it is possible to ensure an area, in which a unit side gear 193 is provided, in the central portion 183.

Such optical components 18A to 18D are cyclically placed in one optical path (optical path including the optical axis A within the camera 1) through rotation of the base plate 181. In this example, as viewed from the front side, among the optical components 18A to 18D, the optical component (optical component 18A in the situation shown in FIGS. 4 and 7) disposed at a position on the upper left side is placed in the optical path. As described above, as viewed from the front side, each of the optical components 18A to 18D is cyclically used at the position on the upper left side, and the housing section 16A is disposed to be projected toward the lower right side, and the operation dial 15 is provided on the housing section 16A. Thereby, this configuration is further advantageous in reduction in size.

In the embodiment, as shown in FIG. 5, the plurality of openings a1 is disposed such that a part of a long side a11 of the rectangular shape of one opening a1 faces a part of a short side a12 of the opening a1 adjacent thereto. Here, one long side a11 of each opening a1 is disposed to face one short side a12 of the adjacent opening a1. In other words, a part of the long side a11 of the rectangular shape of the opening a1 is disposed to face a rotation center b1 of the base plate 181. Alternatively, the long sides a11 of the respective openings a1 are disposed to surround the rotation center b1. Alternatively, the plurality of openings a1 is disposed to be shifted (offset) from the positions at which the openings are arranged radially as a whole (the openings are arranged in a cross shape to be described later). Alternatively, a segment a13, which equally divides one opening a1 thereof in parallel with a long side a11 of the opening a1, is disposed to be deviated from an axis r3 (third axis) which extends from the rotation center b1 of the base plate 181 in the diameter direction (not to make the segment a13 coincide with the axis r3). Here, the segment a13 of each opening a1 is disposed to be deviated from the axis r3 of the base plate 181 (not to make the segment a13 coincide with the axis r3).

Specifically, it is preferable that the four openings a1 be arranged in a swastika shape as a whole. Due to arrangement of the swastika shape, the four openings a1 each having a rectangular shape can be disposed efficiently (in a state where unnecessary space is omitted) on the base plate 181 having a discoidal shape. That is, the optical components 18A to 18D can be efficiently disposed. Thereby, the diameter of the base plate 181 and the projection area can be reduced. In other words, an area, which the openings a1 occupy, in the surface of the base plate 181 increases.

More specifically, the four openings a1 respectively have the same shapes as one another and rectangular shapes having the same dimensions (design values) as one another. Thus, when the base plate 181 is rotated, the shapes and the positions are designed to coincide with one another for every 90 degrees. In other words, such four openings a1 have a rotational symmetry of 4-fold symmetry as a whole. However, the shapes and dimensions of the respective openings a1 may not be completely identical, and may be designed such that the opening a1 is placed in the same one optical path through rotation as described above.

In the optical unit 18 having such optical components 18A to 18D, the central portion 183 of the base plate 181 is fixed onto and supported on the gear (unit side gear 193) which is provided on the housing section 16A. In this example, the central portion 183 of the optical unit 18 is fixed onto the unit side gear 193 of the housing section 16A through a screw 184. That is, the optical unit 18 rotates around the same shaft as the shaft (rotational shaft b1) of the unit side gear 193. In the front view shown in FIG. 3, the central portion 183 (rotation center) of the base plate 181 is disposed to be deviated from both of the axis r1 (first axis), which vertically extends through the optical axis A, and the axis r2 (second axis) which horizontally extends through the optical axis A.

In the housing section 16A, there is further provided a gear (transfer gear 192) for transferring power in connection with the unit side gear 193. The transfer gear 192 has, for example, two gears 192A and 192B, and is connected to the input side gear 191. The input side gear 191 is connected to the above-mentioned operation dial 15 so as to rotate around the same axis as the axis of the operation dial 15. With such a configuration, power based on an operation performed by a user using the operation dial 15 is transferred to the central portion 183 of the optical unit 18 through the input side gear 191, the transfer gear 192, and the unit side gear 193, thereby rotating the optical unit 18.

Through rotation (rotation of the base plate 181) of the optical unit 18, the optical components 18A to 18D are cyclically placed in the optical path (the optical path passing through the optical axis A) of the camera 1. That is, the optical components 18A to 18D can be switched by the user's operation, and thus it is possible to perform photography using respective functions of the optical components 18A to 18D.

It should be noted that the operation dial 15 and the switching mechanism using the input side gear 191, the transfer gear 192, and the unit side gear 193 are just examples, and the present disclosure is not limited to this. It is preferable that the mechanism be a mechanism by which the optical components 18A to 18D are cyclically placed in one optical path through rotation of the base plate 181.

Further, the optical unit 18 may be built into the chassis member 16 integrated with the body mount 20, or may be built into another optical apparatus such as an adapter, on the front surface of the body 10 as described above.

Mechanism for Suppressing Swinging and Dust In the housing section 16A, a suppression flange 185 is provided at one location, or suppression flanges 185 are provided at a plurality of locations (here, three locations), as shown in FIG. 7. The suppression flanges 185 are placed on the single side of the base plate 181 of the optical unit 18, and are members (suppression members) for suppressing wobbling or tilting (swinging) in the thickness direction of the base plate 181.

Figure 8:
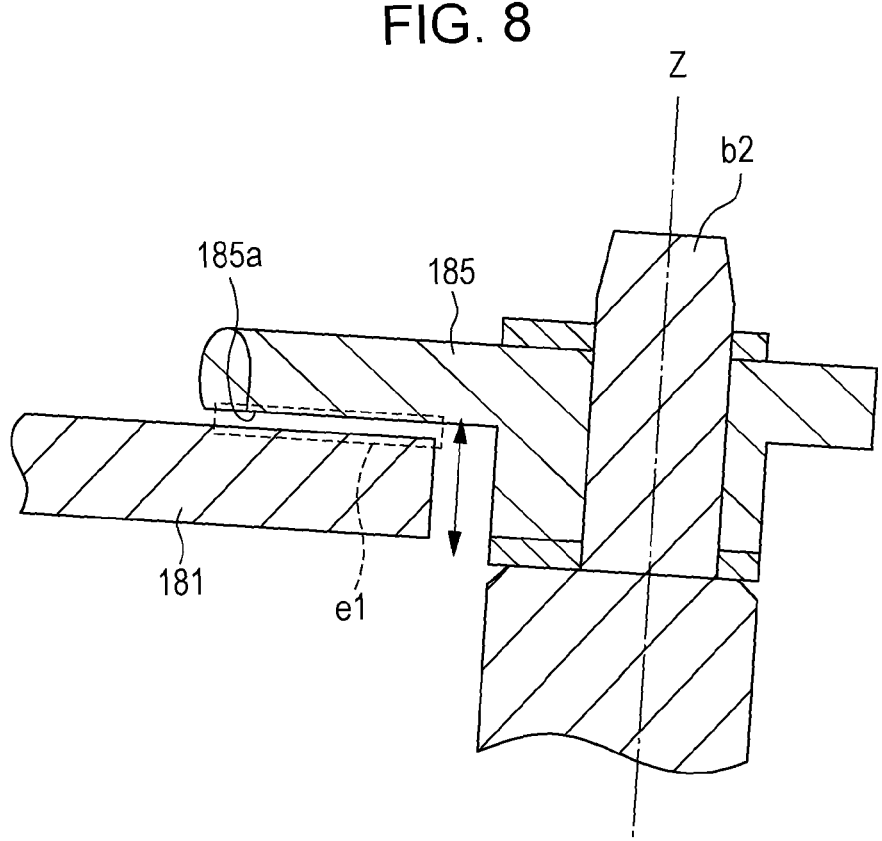
FIG. 8 is a cross-sectional view illustrating a configuration of the vicinity of a suppression flange shown in FIG. 7 in an enlarged manner.

FIG. 8 shows a cross-sectional configuration of the vicinity of one suppression flange 185, in an enlarged manner. As described above, the suppression flange 185 has a surface 185a that is capable of coming into direct contact with the base plate 181. Thereby, if the base plate 181 comes into direct contact with the suppression flange 185 due to swinging of the base plate 181, the base plate 181 and the suppression flange 185 come into surface contact with each other (e1 in FIG. 8). Through surface contact rather than point contact, the direct contact between the base plate 181 and the suppression flange 185 prevents the surface of the base plate 181 from being scraped and dust from occurring.

It is preferable that the three suppression flanges 185 be provided at positions where the circumference of the base plate 181 is equally divided. That is, it is preferable that segments connecting the center of the circle of the base plate 181 to the centers of the circles of the respective suppression flanges 185 be disposed to form 120° to one another. The reason is that it is possible to substantially reliably suppress swinging of the base plate 181.

The suppression flange 185 further has a rotational shaft b2, which extends along the direction of the optical axis Z, so as to be rotatable around the rotational shaft b2. Thereby, when the suppression flange 185 comes into contact with the base plate 181 due to rotation and swinging of the base plate 181, the suppression flange 185 rotates. With such a rotation mechanism, it is possible to prevent dust from occurring as described later. Further, by enhancing the material of the surface of the base plate 181, it is possible to further effectively prevent dust from occurring. For example, by performing alumite processing or further performing coating (such as lubricating coating) on the surface of the base plate 181, it becomes easy to prevent dust from occurring.

EFFECTS AND ADVANTAGES

In the camera 1 of the embodiment, a user turns the operation dial 15 at desired timing, whereby the power is transferred to the optical unit 18 through the input side gear 191, the transfer gear 192, and the unit side gear 193. As a result, the optical unit 18 rotates. Through the rotation, one of the optical components 18A to 18D is placed in the optical path (the optical path including the optical axis A) of the camera 1. As described above, a user is able to cyclically switch plural kinds of the optical components 18A to 18D. Consequently, by using the desired one of the optical components 18A to 18D, it is possible to perform photography according to the purpose or the taste.

Figure 9:
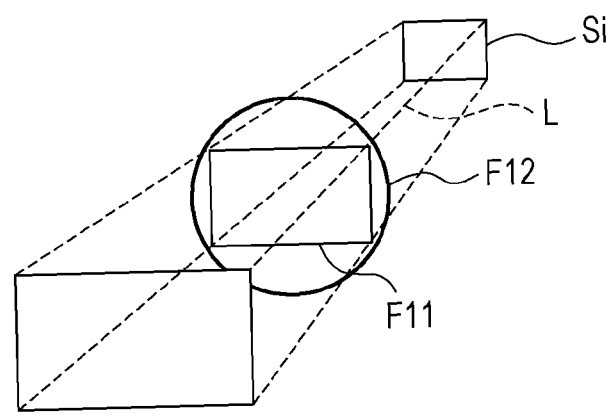
FIG. 9 is a schematic diagram illustrating an effect of the optical unit shown in FIG. 4.

Here, in the optical unit 18, the shape of each opening of the plurality of openings a1 has a rectangular shape. Thereby, for example, when the opening shape is a circular shape (ring shape), the projection area decreases. As schematically shown in FIG. 9, in consideration of the optical path L of the camera 1, in the case of a circular shape F12, useless space occurs in the vicinity of circumference. In contrast, in the case of a rectangular shape F11, the shape becomes close to a rectangular shape of an image plane Si, whereby the useless space is omitted, and the projection area decreases.

Further, in the optical unit 18, the four openings a1 are disposed to form, for example, a swastika shape as a whole, whereby the occupied area in the surface of the base plate 181 of the optical components 18A to 18D and the openings a1 increases (useless space is reduced). Hereinafter, the reason will be described.

Figure 10:
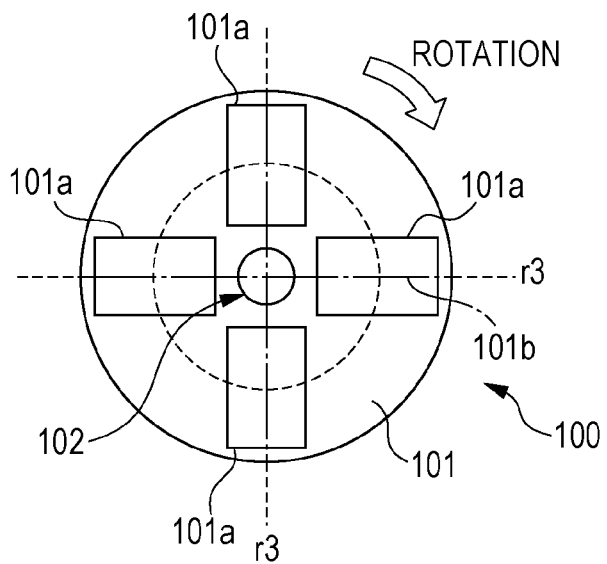
FIG. 10 is a front view illustrating a configuration of an optical unit according to Comparative Example 1.

FIG. 10 shows a configuration of the optical unit 100 that has openings 101a each having the rectangular shape on the base plate 101 of the discoidal shape as Comparative Example 1 of the embodiment. In Comparative Example 1, the plurality of openings 101a is radially arranged as a whole. In this example, the four openings 101a are arranged in a cross shape as a whole. Further, short sides of the rectangular shapes of the openings 101a are disposed to face the central portion 102 of the base plate 101. In other words, in the rectangular shape of the opening 101a, a segment 101b, which equally divides the opening 101a in parallel with the long sides thereof, is disposed at a position in the axis r3, which extends from the central portion 102 in the diameter direction, (such that the segment 101b coincides with the axis r3). With such a configuration, in the optical unit 100 of the comparative example, the positions of the four openings 101a are cyclically switched through the rotation for every 90° on the base plate 101.

However, in Comparative Example 1, the four openings 101a are arranged in a cross shape on the base plate 101 having a discoidal shape, and thus useless space (space other than openings 101a) is large. As a result, the projection area of the entire base plate 101 becomes large.

In contrast, in the embodiment, as shown in FIG. 5, for example, a part of the long side a11 of each opening a1 is disposed to face a part of the short side a12 of the adjacent opening a1 such that the openings a1 form a swastika shape. In other words, in the rectangular shape of the opening a1, the segment a13, which equally divides the opening a1 in parallel with the long side a11, is disposed to be deviated from the axis r3 which extends from the rotation center b1 in the diameter direction (not to make the segment a13 coincide with the axis r3). Due to this arrangement, compared with Comparative Example 1, useless space in the base plate 181 is reduced. Accordingly, the projection area of the base plate 181 decreases, and the space for mounting of the optical unit 18 is reduced.

In addition, in the embodiment, the suppression flanges 185 are provided on one surface side of the base plate 181 of the optical unit 18. Thereby, swinging of the optical unit 18 is suppressed.

Figure 11:
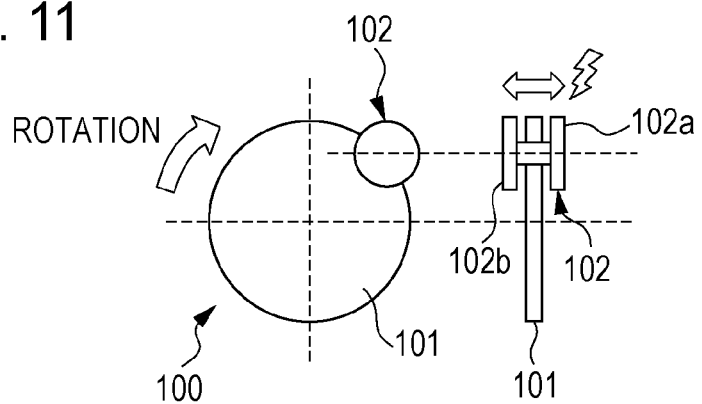
FIG. 11 is a front view illustrating a configuration of an optical unit and a suppression flange according to Comparative Example 2.

Here, FIG. 11 schematically shows a configuration of a suppression flange 102 according to Comparative Example 2 of the embodiment. The suppression flange 102 (102a, 102b) is provided with the base plate 101 interposed between both surfaces. Further, the suppression flange 102 is provided at only one location in the circumferential direction of the base plate 101. However, in a similar manner to Comparative Example 2, when the suppression flanges 102 are provided on both sides of the base plate 101, the space for mounting increases, and reduction in size becomes difficult. Further, when the suppression flange 102 is provided at only one location, excessive force is applied at the time of sliding on the base plate 101, and thus it becomes easy for dust to occur. When the suppression flanges are provided at three locations, the force at the time of frictional sliding is distributed, but the space for mounting increases.

Figure 12:
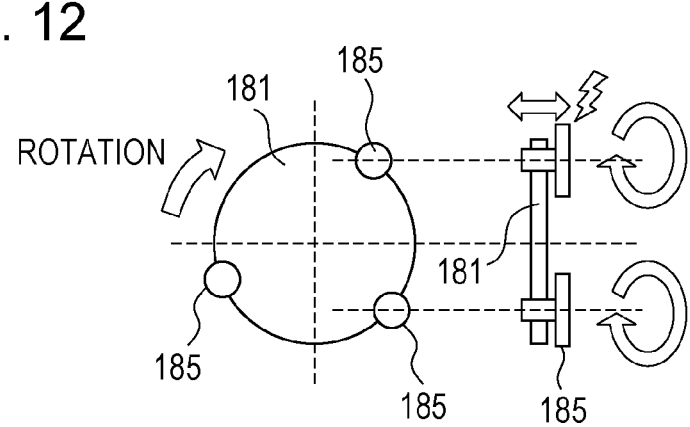
FIG. 12 is a schematic diagram illustrating an effect of the suppression flange shown in FIG. 7.

In contrast, in the embodiment, as shown in FIG. 12, the suppression flanges 185 are provided to correspond to the three locations in the circumferential direction of the base plate 181, and the suppression flanges 185 are provided to face only one surface side of the base plate 181. Thereby, compared with the case where the suppression flanges are interposed between both sides thereof, the space for mounting decreases.

Further, since the suppression flange 185 has a surface 185a, if the base plate 181 comes into direct contact with the suppression flange 185, the base plate 181 and the suppression flange 185 come into surface contact with each other (e1 in FIG. 8). Through surface contact rather than point contact, the direct contact between the base plate 181 and the suppression flange 185 prevents the surface of the base plate 181 from being scraped and dust from occurring.

Further, since the three suppression flanges 185 are provided at positions where the circumference of the base plate 181 is equally divided, it is possible to substantially reliably suppress swinging of the base plate 181. As described above, since the suppression flanges 185 are provided on one surface side of the base plate 181, even when the suppression flanges 185 are provided at a plurality of locations, the space for mounting is unlikely to increase. That is, while suppressing an increase in the space for mounting, it is possible to provide the suppression flanges 185 corresponding to three locations in the circumferential direction of the base plate 181, and thus it is possible to prevent dust from occurring.

In addition, each suppression flange 185 has a rotational shaft b2 that extends along the direction of the optical axis Z, and is thus rotatable around the rotational shaft b2. Thereby, when the suppression flange 185 comes into contact with the base plate 181 due to rotation and swinging of the base plate 181, the suppression flange 185 rotates. With such a rotation mechanism, it is possible to relieve stress at the time of direct contact, and thus it is possible to prevent dust from occurring. Further, it is possible to prevent sound from occurring at the time of frictional sliding.

As described above, in the present embodiment, in the optical unit 18, the shape of each opening of the plurality of openings a1 provided on the base plate 181 has a rectangular shape (the opening shape of the opening a1 is a rectangular shape). Thereby, compared with the case where the opening shape is circular, it is possible to reduce the projection area. Further, the plurality of openings a1 is cyclically placed in the optical path including the optical axis A through rotation of the base plate 181, and is arranged in, for example, a swastika shape as a whole. Thereby, for example, compared with a case where the plurality of openings is disposed to be radially arranged as a whole, useless space in the base plate surface is reduced. Consequently, it is possible to reduce the projection area (diameter) of the base plate 181. Accordingly, it is possible to achieve reduction in size through reduction in the space for mounting.

Example of Mounting of Adapter

Figures 13A, 13B:
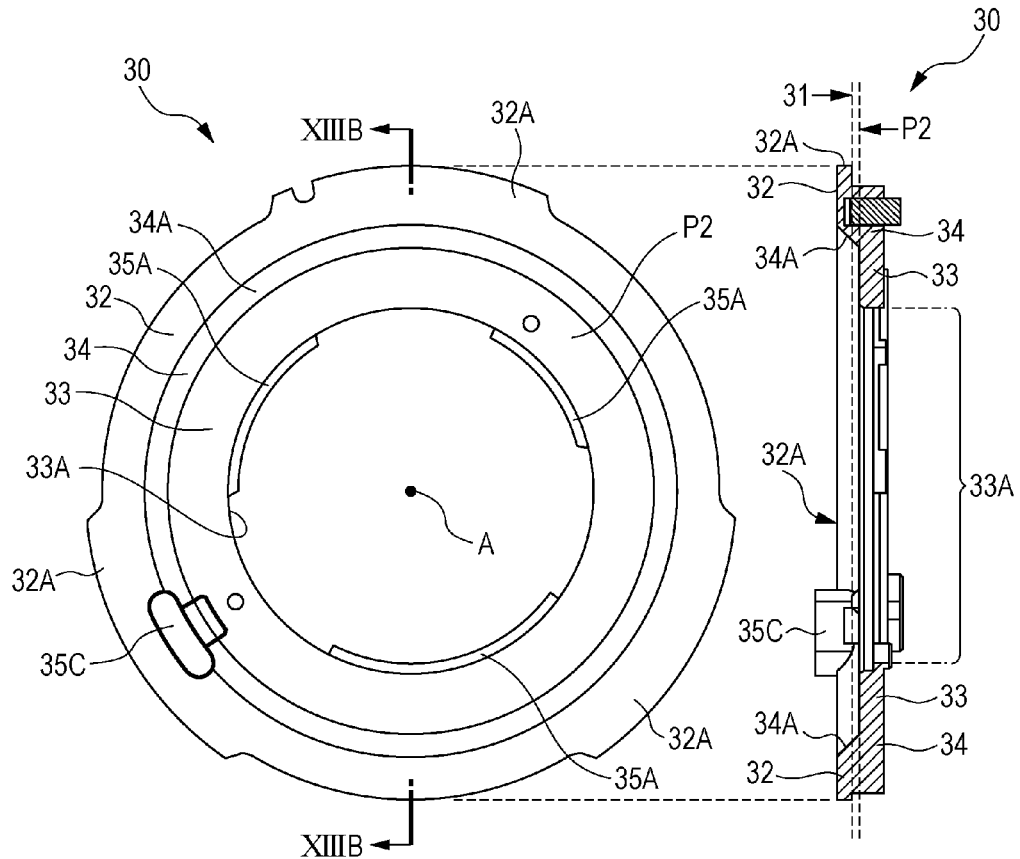
FIG. 13A is a front view of an adapter.
FIG. 13B is a cross-sectional view of the adapter taken along the line XIIIB-XIIIB of FIG. 13A.
Figure 14:
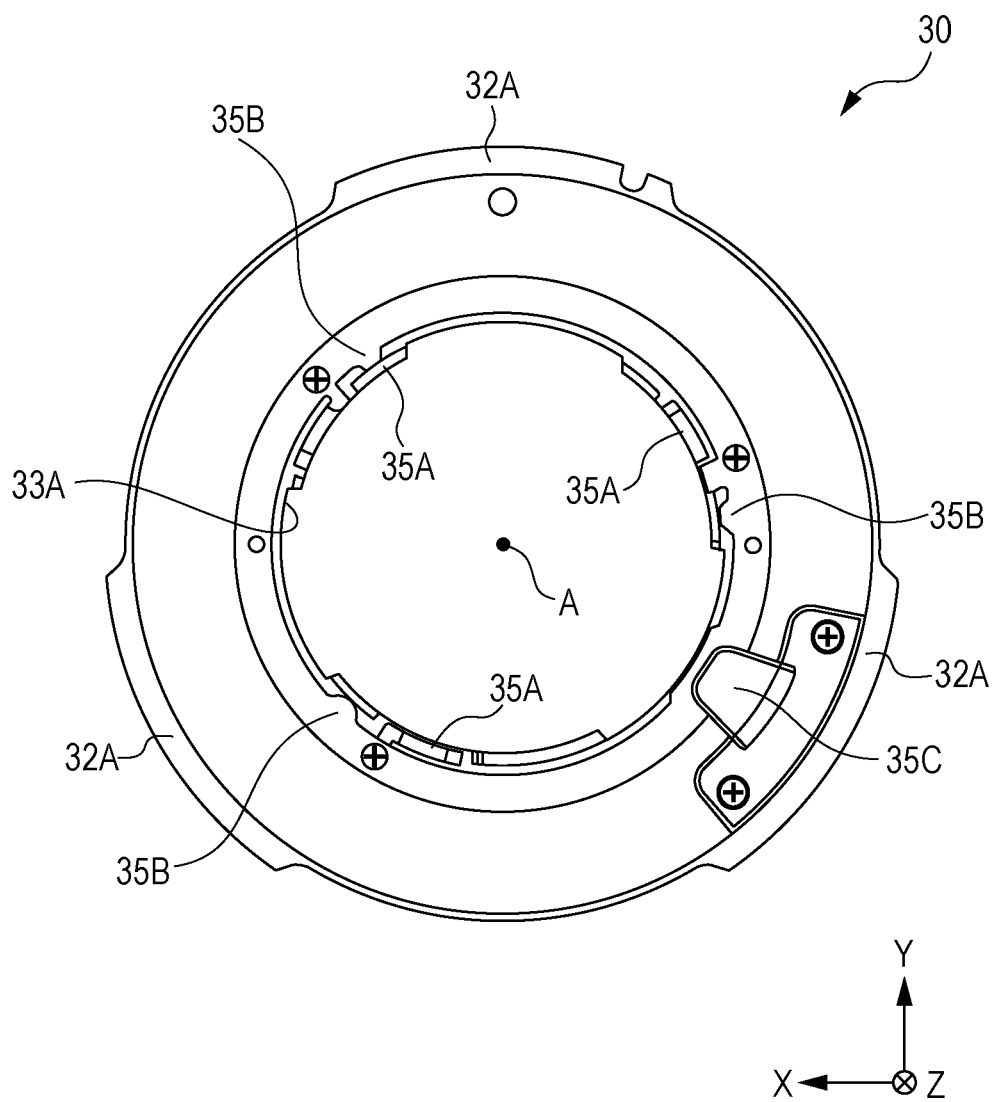
FIG. 14 is a rear view of the adapter shown in FIGS. 13A and 13B.
Figure 15:
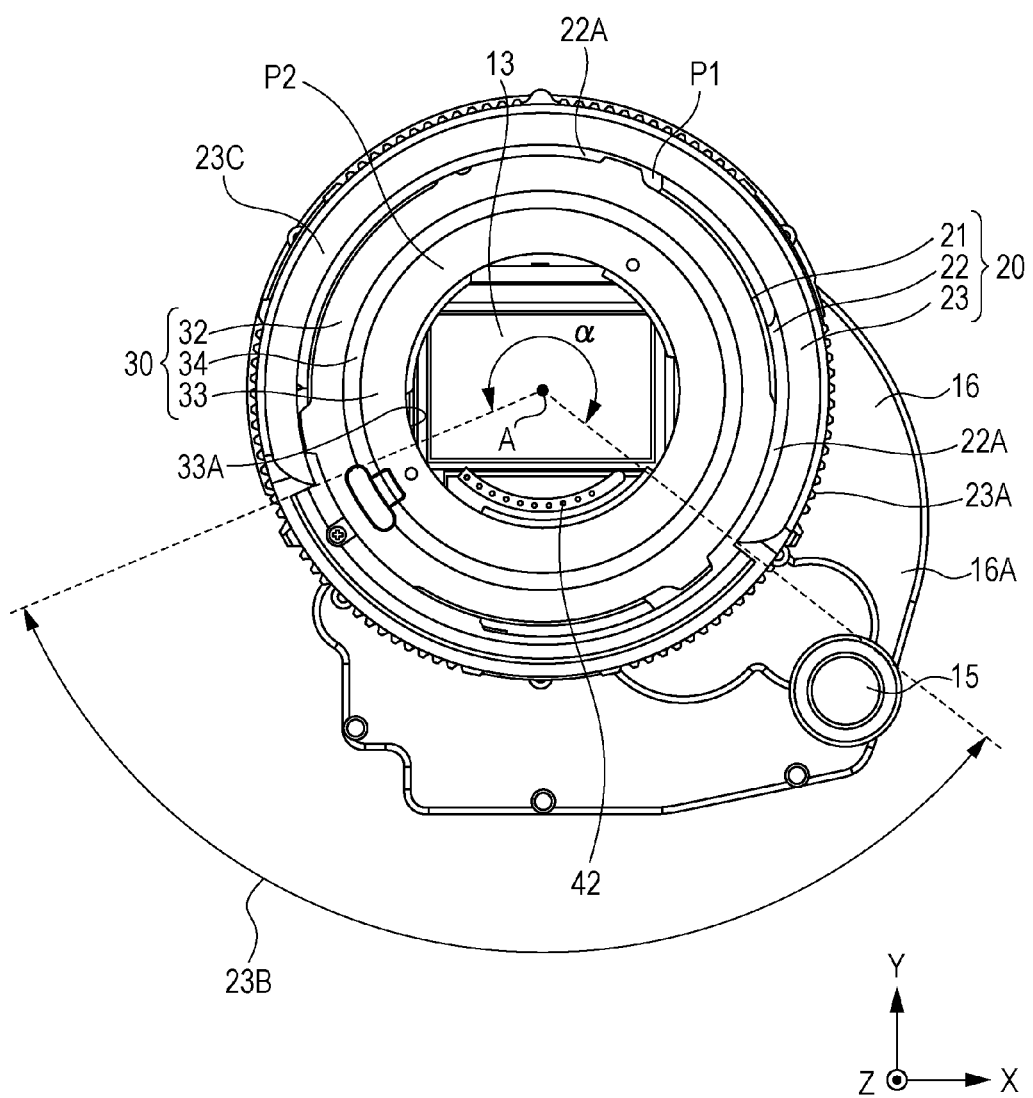
FIG. 15 is a front view of the adapter in a situation where the adapter is mounted on the body mount shown in FIG. 2.

In the camera 1 equipped with the above-mentioned optical unit 18, due to space saving of the optical unit 18, for example, an adapter (adapter 30) to be described below can be mounted on the body mount 20. FIG. 13A shows a configuration of the adapter 30 viewed from the front side. FIG. 13B shows a cross-sectional configuration of the adapter 30 taken along the line XIIIB-XIIIB of FIG. 13A. FIG. 14 shows a configuration of the adapter 30 shown in FIGS. 13A and 13B viewed from the rear side. FIG. 15 shows a configuration of the adapter 30 viewed from the front side of the body mount 20 in a situation where the adapter 30 is mounted on the body mount 20. In addition, FIG. 15 also shows the fastening ring 23.

The adapter 30 is fastened onto the body mount 20 in, for example, a bayonet method. The adapter 30 is to mount a lens on the body mount 20. The lens has a flange back (hereinafter referred to as a flange back FB2) shorter than the flange back (hereinafter referred to as a flange back FB1) unique to the body 10 of the camera 1. By using the adapter 30, the lens can be mounted on the camera 1 without interchanging the entire body mount 20. The lens has the flange back FB2 which is shorter than the flange back FB1 unique to the body 10.

Specifically, for example, as shown in FIGS. 13A and 13B, the adapter 30 has an opening 33A, an outer circumferential portion 32, an inner circumferential portion 33, and an intermediate portion 34. An aperture of the adapter 30 is smaller than an aperture of the body mount 20.

The outer circumferential portion 32 is a portion mounted on the body mount 20, and has a mount surface 31. The mount surface 31 is a surface that is in contact with a first reference surface P1 in a state where the surface is mounted on the first reference surface P1 of the body mount 20. The outer circumferential portion 32 has outer blades 32A that are provided at three locations in the circumferential direction and that are for the mounting on the body mount 20.

The inner circumferential portion 33 is formed in a concentric shape inside the outer circumferential portion 32, and has a second reference surface P2. It is preferable that the second reference surface P2 be positioned to be closer to the imaging surface side than the mount surface 31 in the optical axis direction Z. With such a configuration, the lens having the flange back FB2 can be mounted on the body mount 20 through the adapter 30.

The intermediate portion 34 is a stepped portion that connects the outer circumferential portion 32 and the inner circumferential portion 33 in the optical axis direction Z. It is preferable that the intermediate portion 34 have an inclined surface 34A connecting the outer circumferential portion 32 and the inner circumferential portion 33. Since the intermediate portion 34 has the inclined surface 34A, the intermediate portion 34 can be adapted to various lens shapes. In addition, by providing the inclined surface 34A, extra space is formed around a lens release button 35C to be described later. Thus, an advantage exists in that it becomes easy for a user to press the lens release button 35C.

The rear side of the adapter 30 has, as shown in FIG. 14, for example, inner blades 35A, bayonet mechanisms 35B, and a lens release button 35C. The inner blades 35A are for mounting the lens on the second reference surface P2. The inner blades 35A are provided at three locations in the circumferential direction of the inner circumferential portion 33. The bayonet mechanism 35B is a spring mechanism that is provided on the rear side of the inner blade 35A, and is configured to press the lens to the second reference surface P2 and suppress positional deviation and displacement of the second lens 2B in the optical axis direction Z.

The lens release button 35C is, as shown in FIG. 13A, a push button for releasing the lens from the adapter 30. The lens release button 35C is provided on the lower left side of the intermediate portion 34 and the outer circumferential portion 32. However, in FIG. 13A, an X direction is set as the left-right direction of the page, and a Y direction is set as the up-down direction of the page. It is preferable that the lens release button 35C be projected to be closer to the lens side than the front surface 32A of the outer circumferential portion 32 in the optical axis direction Z, as shown in FIG. 13B. With such a configuration, a user is able to easily press the lens release button 35C with a flat portion of a finger rather than a nail tip of a finger. As a result, usability thereof is improved.

In the state where the adapter 30 is mounted on the first reference surface P1, the first contact point 41 is concealed in the adapter 30. Thus, it is preferable that the second contact point 42 be exposed to the inner circumference rather than the adapter 30. Thereby, in the state where the adapter 30 is mounted on the first reference surface P1, the second contact point 42 is exposed to the inner circumference side of the adapter 30, whereby the second contact point 42 and the lens can be easily connected.

Further, it is preferable that the fastening ring 23 have a notch portion 23B on a portion in the circumference, for example, the lower side as the body mount 20 is viewed from the front side. The notch portion 23B is configured to be at a lower level in the optical axis direction Z in a portion of the circumference of the fastening ring 23. Thereby, space is formed on the lower side of the fastening ring 23, and thus it is possible to avoid interference between the fastening ring 23 and the components projected toward the lower side from the lens barrel. It is preferable that the level of the notch portion 23B in the optical axis direction Z be formed to be, for example, coplanar or substantially coplanar with the holding ring 22.

The fastening ring 23 has not only the notch portion 23B but also a standing wall portion 23C. It is preferable that a central angle α of the standing wall portion 23C about the optical axis A be equal to or greater than 180°. Thereby, it is possible to assist a user to easily turn the standing wall portion 23C with a hand. In addition, an uneven slip stopper 23A may be provided on the standing wall portion 23C, and may be provided on both of the standing wall portion 23C and the notch portion 23B.

It is preferable that the lens release button 35C of the adapter 30 be provided in an area of the notch portion 23B of the fastening ring 23. Thereby, a user is able to easily press the lens release button 35C, and thus convenience in use is improved.

Further, it is preferable that the lens release button 35C of the adapter 30 be positioned on the obliquely lower side of the circumference of the body mount 20, for example, on the lower left side or the lower right side thereof, as the body mount 20 is viewed from the front side. When the lens release button 35C is disposed on the lower side of the circumference of the body mount 20, there is a concern that it is difficult to operate the lens release button 35C due to interference between the button and the component which becomes adjunct onto the lower side of the second lens 2B. Further, in most cases, an assistant cameraman who assists a main cameraman stands beside the camera 1 and operates the lens release button 35C. Accordingly, since the lens release button 35C is disposed on the lower left side or the lower right side, it becomes easy for an assistant cameraman to operate the lens release button 35C. Accordingly, a working efficiency improves.

In FIG. 15, the operation dial 15 is disposed on the lower right side, and the lens release button 35C is disposed on the lower left side. However, both the operation dial 15 and the lens release button 35C may be disposed on the lower left side or on the lower right side.

Here, when the adapter 30 for a lens having a shorter flange back is mounted on the body mount 20, it is preferable that the adapter 30 and the body mount 20 be configured to interfere with each other as little as possible. In the camera 1 having the optical unit 18 of the embodiment, it is possible to save space in the optical unit 1 as described above. Therefore, even when the adapter 30 is mounted, it is easy to avoid interference.

In addition, in the example, the adapter 30 compatible with the lens having a shorter flange back is exemplified. However, similarly to general type adapters, an adapter compatible with a lens having a longer flange back may be mounted. Further, the adapter 30 is not limited to the adapter employing a bayonet method as a method of mounting a lens, and may use an adapter employing a spigot method.

APPLICATION EXAMPLES

Hereinafter, application examples of the camera 1 will be described.

First Application Example

Figure 16:
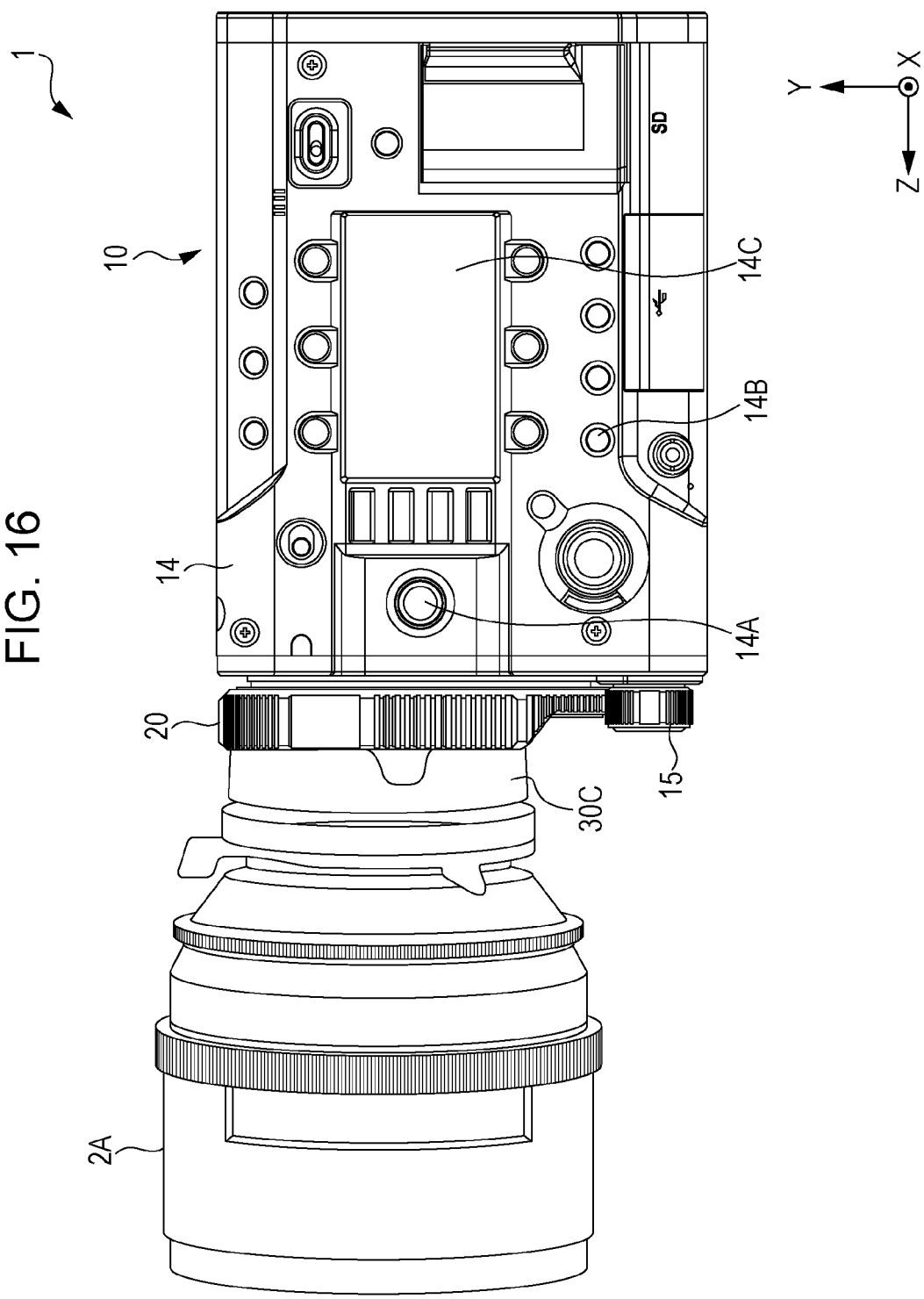
FIG. 16 is a side view illustrating a first application example of the camera shown in FIG. 1 in a situation where a cinema photography lens is mounted thereon through a predetermined adapter.

The camera 1 can be used in a state where, for example, an adapter 30C for cinema photography lens is mounted on the body mount 20 and a lens 2A for cinema photography is mounted on the adapter 30C, as shown in FIG. 16. The body 10 may be further equipped with a viewfinder, a recorder, a battery, and the like (none of these are shown in the drawing).

The adapter 30C is to change the body mount 20 of the camera 1 into a PL mount which is a cinema industry standard. The adapter 30C and the lens 2A have a flange back longer than the flange back FB1 unique to the body 10. By using the adapter 30C, it is possible to mount the lens 2A having the longer flange back on the body mount 20.

Second Application Example

Figure 17:
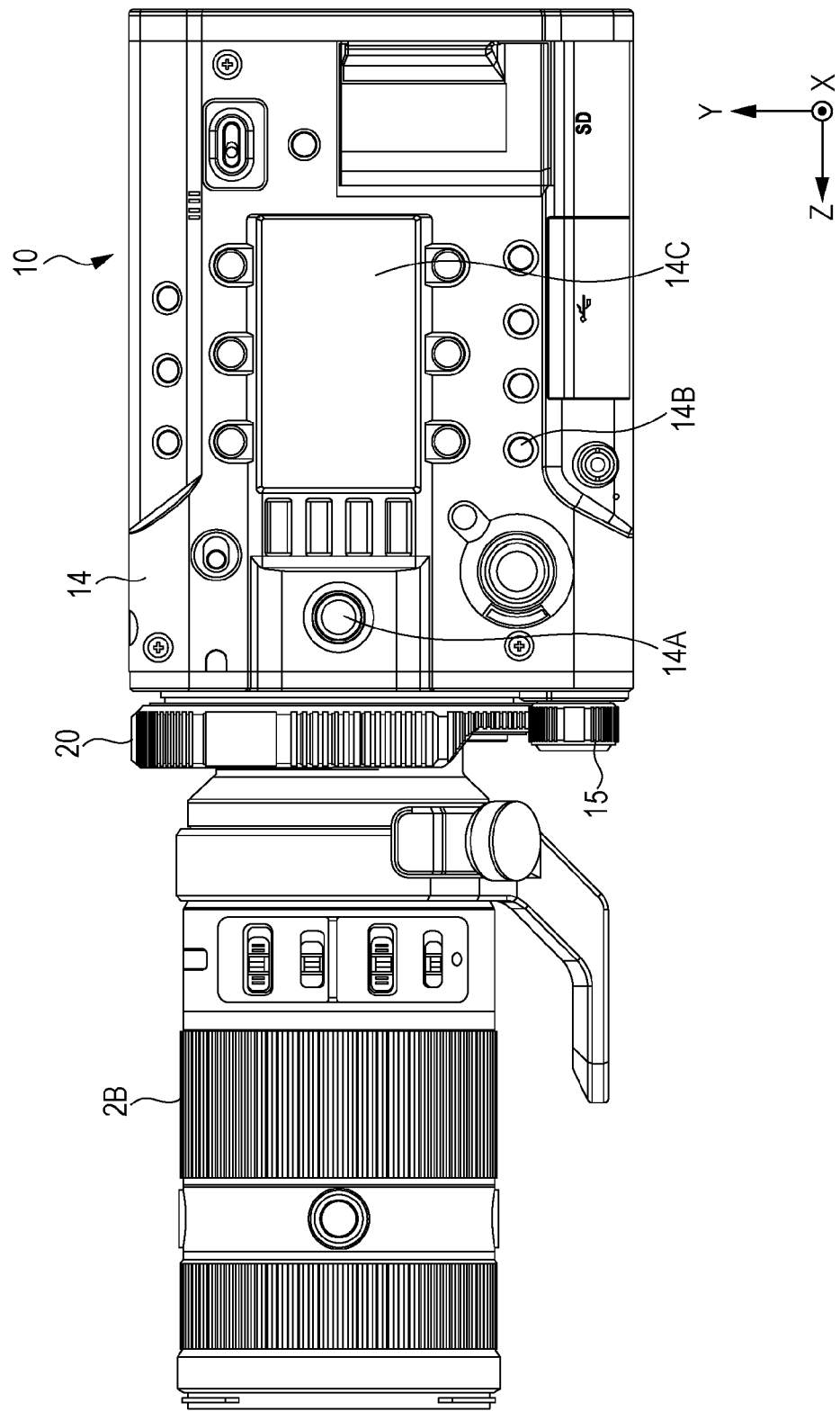
FIG. 17 is a side view illustrating a second application example of the camera shown in FIG. 1 in a situation where a still image photography lens is mounted thereon through a predetermined adapter.

Alternatively, the camera 1 can be used in a state where the adapter 30 is mounted on the body mount 20 and, for example, a lens having a flange back shorter than that of the lens 2B for still image photography the like is mounted on the adapter 30, as shown in FIG. 17. The lens 2B is, for example, a still image photography lens for mirrorless camera, and has a flange back shorter than the flange back unique to the body 10. In addition, the lens 2B may be a single-lens reflex lens, and may be a lens capable of photographing both a still image and a moving image.

As described above, by using the adapter 30 of the present disclosure, a user of the lens 2A, which has been used in the video industry, is able to easily use the lens 2B, which has been used in the photography industry. Accordingly, by lowering barriers of classification of applications for cinema photography, broadcast, consumer-oriented still image photography, and the like, a user easily obtains new experience opportunities. As a result, it is possible to increase video representability.

The present disclosure has hitherto been described with reference to the embodiment, but the present disclosure is not limited to the embodiment, and may be modified into various forms. For example, in the embodiment, in the optical unit 18, the optical components 18A to 18D are mounted on the base plate 181 through the frame members 182, but the optical components 18A to 18D may be directly bonded to the base plate 181. In this case, the frame members 182 become unnecessary, and thus this configuration is advantageous in space saving. Further, the opening, which is open to the base plate 181, is an opening which is effective in the optical unit, and corresponds to the "opening" in the present disclosure.

The embodiment showed an example in which the four openings a1 are provided on the base plate 181 of the optical unit 18, but the number of openings in the optical unit of the present disclosure is not limited to this, may be two or three, and may be five or more. Further, the optical components may be provided to correspond to all the plurality of openings, but it is not indispensable for the optical components to be provided to correspond to all the openings. Only a selected opening may be supported by the optical components. For example, in a state where the optical components are respectively mounted on three openings among the four openings of the base plate and no optical component is mounted on the other opening, the optical unit may be mounted on the camera.

The embodiment showed an example in which the surface shape of the base plate 181 is circular, but the surface shape of the base plate does not have to be circular, and may be, for example, a regular polygon.

The embodiment showed an example in which the first contact point 41 is provided on the left side of the circumference of the body mount 20 and the second contact point 42 is provided on the lower side of the circumference of the body mount 20, as the body mount 20 is viewed from the front side. However, arrangement of the first contact point 41 and the second contact point 42 is not limited to the example of the embodiment, and may be modified into various forms.

Further, the shapes, the dimensions, the materials, and the like of the elements described in the above embodiment are not limited, and other shapes, dimensions, and materials may be used.

Furthermore, for example, in the embodiment, the configurations of the camera 1 and the adapter 30 have been described in detail, but it is not necessary to provide all the elements, and other elements may be further provided.

The advantages described in the embodiment and the like are just examples, other advantages may be present, and the advantages may further include other advantages.

It should be noted that the present disclosure may adopt the following configurations:

(1) A camera that has an optical unit, the camera including a base plate, a plurality of openings which is provided on the base plate and each of which has a substantially rectangular opening shape having long sides and short sides, and a plurality of optical components each of which covers any of the plurality of openings, in which the plurality of openings is disposed to be cyclically placed in one optical path through rotation of the base plate, and is disposed such that a part of a long side of each opening thereof faces a part of a short side of another opening thereof adjacent thereto.

(2) The camera according to (1), in which four openings are disposed as the plurality of openings, and the four openings form a swastika shape as a whole.

(3) The camera according to (1) or (2), in which a surface shape of the base plate is a circular shape, and in which each opening of the plurality of openings has a shape in which corner portions facing circumference of the base plate are cut off or rounded off.

(4) The camera according to any one of (1) to (3), further including a single suppression member or a plurality of suppression members for suppressing swinging in a thickness direction of the base plate.

(5) The camera according to (4), in which the suppression member has a surface that is likely to come into direct contact with one surface of the base plate.

(6) The camera according to (4) or (5), in which the suppression member has a mechanism that is rotatable when in direct contact with the base plate.

(7) The camera according to any one of (4) to (6), in which a surface shape of the base plate is a circular shape, and in which the number of the suppression members is three, and the three suppression members are provided at positions where the circumference of the base plate is equally divided.

(8) The camera according to any one of (1) to (7), in which each opening of the plurality of openings has a shape in which corner portions facing a central portion of the base plate are cut off or rounded off.

(9) The camera according to any one of (1) to (8), further including frame members that are fixed onto the base plate and have the openings, in which the plurality of optical components is detachably mounted on the base plate with the frame member interposed there between.

(10) The camera according to any one of (1) to (8), in which the plurality of optical components is respectively bonded to the base plate.

(11) The camera according to any one of (1) to (10), in which the plurality of optical components is optical filters that have functions different from each other.

(12) The camera according to (11), in which the plurality of optical components is optical filters that have transmittances different from each other.

(13) The camera according to (11), in which the plurality of optical components is optical filters that have polarization directions different from each other.

(14) The camera according to any one of (1) to (13), in which the optical unit is mounted on a body mount so as to be projected obliquely downward from a circumference portion of the body mount as viewed from the front side.

(15) The camera according to any one of (1) to (14), further including a single gear or a plurality of gears that transfers power for rotating the base plate of the optical unit, and an operation section that is connected to the gear and that a user is able to operate.

(16) The camera according to any one of (1) to (15), in which a rotation center of the base plate is disposed to be deviated from both of a first axis, which vertically extends through an optical axis, and a second axis, which horizontally extends through the optical axis, as viewed from the front side.

(17) A camera that has an optical unit, the camera including a base plate, a plurality of openings which is provided on the base plate and each of which has a substantially rectangular opening shape having long sides and short sides, and a plurality of optical components each of which covers any of the plurality of openings, in which the plurality of openings is disposed to be cyclically placed in one optical path through rotation of the base plate, and is disposed such that a segment, which equally divides each opening thereof in parallel with a long side of the opening, is deviated from a third axis which extends radially from a rotation center of the base plate.

(18) The camera according to (17), in which each opening of the plurality of openings has a shape in which corner portions facing a central portion of the base plate are cut off or rounded off.

(19) The camera according to (17) or (18), further including frame members that are fixed onto the base plate and have the openings, in which the plurality of optical components is detachably mounted on the base plate with the frame member interposed there between.

(20) An optical unit including a base plate, a plurality of openings which is provided on the base plate and each of which has a substantially rectangular opening shape having long sides and short sides, and a plurality of optical components each of which covers any of the plurality of openings, in which the plurality of openings is disposed such that a part of a long side of each opening thereof faces a part of a short side of another opening thereof adjacent thereto.

It should be understood by those skilled in the art that various modifications, combinations, sub-combinations and alterations may occur depending on design requirements and other factors insofar as they are within the scope of the appended claims or the equivalents thereof.

What is claimed is:

1. A camera that has an optical unit, the camera comprising:
    a base plate;
    a plurality of openings which is provided on the base plate and each of which has a substantially rectangular opening shape having long sides and short sides; and
    a plurality of optical components each of which covers any of the plurality of openings,
    wherein the plurality of openings is disposed to be cyclically placed in one optical path through rotation of the base plate, and is disposed such that a part of a long side of each opening thereof faces a part of a short side of another opening thereof adjacent thereto.

2. The camera according to claim 1, wherein four openings are disposed as the plurality of openings, and the four openings form a swastika shape as a whole.

3. The camera according to claim 1,
    wherein a surface shape of the base plate is a circular shape, and
    wherein each opening of the plurality of openings has a shape in which corner portions facing circumference of the base plate are cut off or rounded off.

4. The camera according to claim 1, further comprising a single suppression member or a plurality of suppression members for suppressing swinging in a thickness direction of the base plate.

5. The camera according to claim 4, wherein the suppression member has a surface that is likely to come into direct contact with one surface of the base plate.

6. The camera according to claim 4, wherein the suppression member has a mechanism that is rotatable when in direct contact with the base plate.

7. The camera according to claim 4,
    wherein a surface shape of the base plate is a circular shape, and
    wherein the number of the suppression members is three, and the three suppression members are provided at positions where the circumference of the base plate is equally divided.

8. The camera according to claim 1, wherein each opening of the plurality of openings has a shape in which corner portions facing a central portion of the base plate are cut off or rounded off.

9. The camera according to claim 1, further comprising frame members that are fixed onto the base plate and have the openings,
    wherein the plurality of optical components is detachably mounted on the base plate with the frame member interposed therebetween.

10. The camera according to claim 1, wherein the plurality of optical components is respectively bonded to the base plate.

11. The camera according to claim 1, wherein the plurality of optical components is optical filters that have functions different from each other.

12. The camera according to claim 11, wherein the plurality of optical components is optical filters that have transmittances different from each other.

13. The camera according to claim 11, wherein the plurality of optical components is optical filters that have polarization directions different from each other.

14. The camera according to claim 1, wherein the optical unit is mounted on a body mount so as to be projected obliquely downward from a circumference portion of the body mount as viewed from the front side.

15. The camera according to claim 1, further comprising
    a single gear or a plurality of gears that transfers power for rotating the base plate of the optical unit; and
    an operation section that is connected to the gear and that a user is able to operate.

16. The camera according to claim 1, wherein a rotation center of the base plate is disposed to be deviated from both of a first axis, which vertically extends through an optical axis, and a second axis, which horizontally extends through the optical axis, as viewed from the front side.

17. A camera that has an optical unit, the camera comprising:
    a base plate;
    a plurality of openings which is provided on the base plate and each of which has a substantially rectangular opening shape having long sides and short sides; and
    a plurality of optical components each of which covers any of the plurality of openings,
    wherein the plurality of openings is disposed to be cyclically placed in one optical path through rotation of the base plate, and is disposed such that a segment, which equally divides each opening thereof in parallel with a long side of the opening, is deviated from a third axis which extends radially from a rotation center of the base plate.

18. The camera according to claim 17, wherein each opening of the plurality of openings has a shape in which corner portions facing a central portion of the base plate are cut off or rounded off.

19. The camera according to claim 17, further comprising
    frame members that are fixed onto the base plate and have the openings,
    wherein the plurality of optical components is detachably mounted on the base plate with the frame member interposed therebetween.

20. An optical unit comprising:
    a base plate;
    a plurality of openings which is provided on the base plate and each of which has a substantially rectangular opening shape having long sides and short sides; and
    a plurality of optical components each of which covers any of the plurality of openings,
    wherein the plurality of openings is disposed such that a part of a long side of each opening thereof faces a part of a short side of another opening thereof adjacent thereto.

* * * * *